Patented Nov. 28, 1939

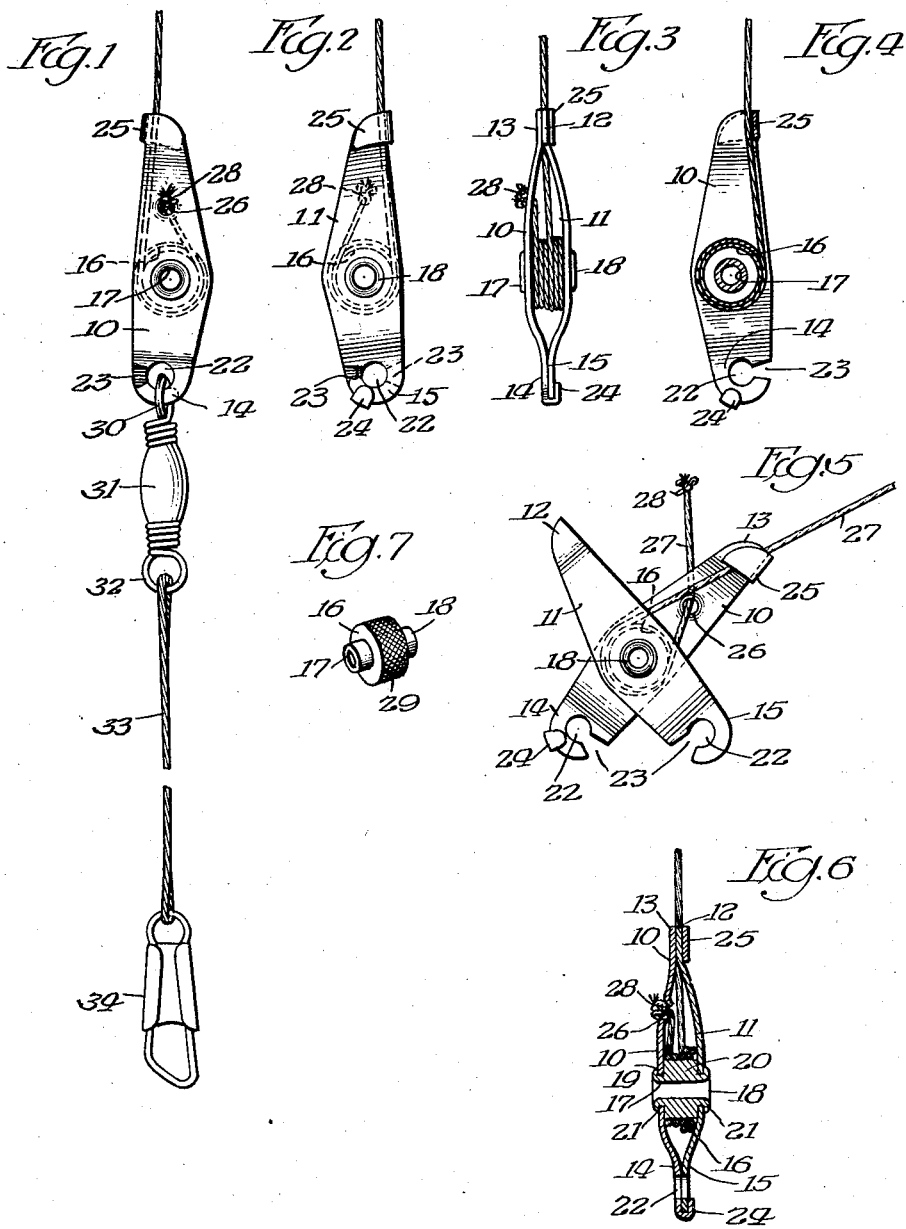

2,181,317

UNITED STATES PATENT OFFICE 2,181,317

ATTACHMENT FOR FISHING LINES

Charles Fernstrom, Oak Island, Minn., assignor of one-half to Carl A. Johnson, Louis Aanerud, and George Stokes, all of Chicago, Ill.

Application July 29, 1938, Serial No. 221,929

14 Claims. (Cl. 43—28)

This invention relates to improvements in attachment for fishing lines but more particularly to an improved but inexpensive fastening means whereby the bait or hook may be fastened or attached to the line without the necessity of forming or providing tie knots between the parts.

It has been found that fishing lines generally break at the point where the knot is made due to the fact that considerable strain is exerted at that point and where the line crosses over itself.

It is one of the objects of the present invention to provide an improved fastening device for securing the bait or hook to the line without the necessity of knotting or tying the parts together, at the same time providing a simple and inexpensive device whereby the parts may be readily connected together and as readily separated.

To the attainment of these ends and the accomplishment of other new and useful objects as will appear, the invention consists in the features of novelty in substantially the construction and in the combination and arrangement of the several parts, hereinafter more fully described and claimed and shown in the accompanying drawing illustrating this invention, and in which Figure 1 is an elevation of a device of this character constructed in accordance with the principles of this invention, showing the same as applied to a line and taken from one side thereof.

Figure 2 is a view similar to Figure 1 with parts omitted and showing the device as taken from the opposite side thereof.

Figure 3 is an end elevation.

Figure 4 is a view partly in elevation and partly in section with some parts omitted.

Figure 5 is a view in elevation of the device showing the parts partially separated.

Figure 6 is a longitudinal sectional view of the device.

Fig. 7 is a perspective view of a detail.

The connector consists essentially of two members arranged side by side and are bowed or concaved at the central portions thereof as at 10 and 11. These members may be of any desired length and width but are of a substantial length and the extremities of the members are adapted to be respectively brought into contact as at 12, 13, 14 and 15.

Intermediate these members is an element forming a spacer which consists preferably of a body 16 having reduced extremities 17—18 adapted to respectively pass into openings 19—20 in the members 10—11, and the reduced extremities 17—18 are preferably flanged over or down as at 21 against the outer faces of the respective members 10—11 for connecting the members together and for holding the element 16 in position.

The members 10—11 are adapted for pivotal movement one with respect to the other.

The extremities 14—15 respectively of each of the members 10—11 are shaped to form an open hook shaped portion 22 and the openings 23 are opposed to each other so that when the two members 10—11 are brought into coinciding relation the entrance opening of each of the hooks will be closed by a portion of the other hook.

If desired, a lip 24 may be provided on one of the members adjacent the hook shaped extremity as a reinforcing means.

When the extremities 12—13 are brought together so that they will rest with their faces against each other, they may be held against separation by means of another lip 25 carried by one of the members. The member 10 is provided with an opening 26 therethrough intermediate and spaced from its edges for a purpose to be described.

The numeral 27 designates a line, such as a fishing line, at one extremity of which there is provided a knot 28. The line is threaded through the opening 26 in the member 10 so that the knot 28 will rest against the outer face of the member 10 in proximity to the opening 26. If desired, this opening 26 may be countersunk as shown more clearly in Figure 6 to receive the knot. The line 27 is then wrapped around the element 16 one or more times, so that said element will constitute a snubbing means.

The line is then passed between the lip 25 and the extremity 13 of the member 10 so that when the member 11 is moved from the position shown in Figure 5 to the positions shown in Figures 1 to 3 the line will be gripped by the extremity 12 and the lip 25.

The periphery of the body portion of the element 16 may be serrated or knurled as at 29, if desired, to increase the efficiency of the device.

When the members 10—11 are in the position shown in Figure 5 the hook shaped portions 22 will be open so that an eye 30 of a swivel element 31 may be inserted into one of the hook shaped portions after which the members 10—11 are positioned with respect to each other to close the openings 23 and thereby hold the element 31 against separation from the connector.

Another swivel 32 may be provided on the element 31 and to this swivel is connected the snell or snood 33 of a fishing hook or bait. In the present exemplification of the invention there is shown a clamping element 34 carried by the free end of the snell.

With this improved connector it will be manifest that a bait or hook may be readily attached to the line without the necessity of tying or knotting the parts together.

By reason of the snubbing element 16 about which a portion of the line 27 is wrapped, it will be seen that the strain exerted upon the line will not be manifested upon the knot 28 but upon the snubber 16.

This will prevent the breaking or cutting of the line at the knotted portion.

It will also be manifest that the device is of a simple nature, inexpensive to manufacture and effective and efficient in operation.

While the preferred form of the invention has been herein shown and described, it is to be understood that various changes may be made in the details of construction and in the combination and arrangement of the several parts, within the scope of the claims, without departing from the spirit of the invention.

What is claimed as new is:

1. A connector for fishing lines embodying two members pivotally connected together intermediate their ends, adapting the ends of the members to be moved towards and away from each other, means adjacent the pivot forming a spacing element for the members, adjacent extremities of the members forming opposed hook shaped portions adapted to be closed when the ends are brought together, and means for holding the other ends of the members together, there being an opening through one of the members intermediate its ends in combination with a line having a knot, said line threaded through the opening with the knot engaging the member, a portion of the line being wound around said spacing element and then passing between the said other ends of the members.

2. A connector for fishing lines embodying two members pivotally connected together intermediate their ends, adapting the ends of the members to be moved towards and away from each other, means adjacent the pivot forming a spacing element for the members, adjacent extremities of the members forming opposed hook shaped portions adapted to be closed when the ends are brought together, a lip carried by one of the members and engaging over the other member for maintaining the hook shaped ends in closing relation, and means for holding the other ends of the members together, there being an opening through one of the members intermediate its ends in combination with a line having a knot, said line threaded through the opening with the knot engaging the member, a portion of the line being wound around said spacing element and then passing between the said other ends of the members.

3. A connector for fishing lines embodying two members pivotally connected together intermediate their ends, adapting the ends of the members to be moved towards and away from each other, means adjacent the pivot forming a spacing element for the members, adjacent extremities of the members forming opposed hook shaped portions adapted to be closed when the ends are brought together, and a lip carried by one of the members and under which lip the other member engages for holding the other ends of said member together, there being an opening through one of the members intermediate its ends in combination with a line having a knot, said line threaded through the opening with the knot engaging the member, a portion of the line being wound around said spacing element and then passing between the said other ends of the members.

4. A connector for fishing lines embodying two laterally spaced substantially parallel members, a spacer between the members and secured to the members intermediate their ends and connecting the members for pivotal movement one with respect to the other, one pair of extremities of the members shaped to provide opposed open hook shaped portions adapted to be closed when said extremities are brought together, and fastening means for separably securing the other extremities of the members together, there being an opening through one of the members intermediate the edges of the latter through which opening a knotted line is adapted to be threaded so that the knot engages a face of the member, a portion of the line being wrapped about said spacer and then passed between the extremities of said members which are opposite to the said hooked extremities.

5. A connector for fishing lines embodying two laterally spaced substantially parallel members, a spacer between the members and secured to the members intermediate their ends and connecting the members for pivotal movement one with respect to the other in substantially parallel planes, one pair of extremities of the members being shaped to provide an aperture adapted to be closed and opened when said extremities are respectively brought together and separated, fastening means for separably securing the other extremities of the members together, there being an opening through one of the members intermediate the edges of the latter through which opening a knotted line is adapted to be threaded so that the knot engages a face of the member, a portion of the line being wrapped about said spacer and then passed between the extremities of said members which are opposite to the extremities, adjacent which latter the first said aperture is located, and means for maintaining said members against movement about their pivots.

6. A connector for fishing lines embodying two members arranged substantially parallel, the adjacent ends of said members adapted to contact said members intermediate the contacting ends being shaped to form opposed concaved portions, a spacer element between the members and to which element the members are connected for pivotal movement one with respect to the other, and open seats in the members at one end, the openings in said seats being opposed to each other, each of said openings being closed by a portion of the other member, there being an opening in one of said members intermediate its edges through which a line is adapted to pass, a portion of the line being wrapped about said spacer element and then passed between the opposite ends of said members.

7. A connector for fishing lines embodying two members, a spacer element between the members intermediate their ends and to which element said members are connected for pivotal movement one with relation to the other, separable co-operating means at one end of the members for receiving and anchoring another element, and means whereby one end of a line may be anchored to one of said members, said line being wound about said spacer element and then passed between the other ends of said members.

8. A connector for fishing lines embodying two members, a spacer element between the members intermediate their ends and to which element both of said members are connected for relative pivotal movement in opposite directions, separable co-operating means at one end of the members for receiving and anchoring another element, means whereby one end of a line may be anchored to one of said members, said line being wound about said spacer element and then passed between the other ends of said members, and means remote from the pivots of said members for releasably securing them against movement about their pivots.

9. A connector for fishing lines embodying two members, a spacer element between the members intermediate their ends and to which element said members are connected for pivotal movement one with relation to the other, separable co-operating means at one end of the members for receiving and anchoring another element, and means whereby one end of a line may be anchored to one of said members, said line being wound about said spacer element and then passed between the other ends of said members, said spacer element being of a diameter less than the width of the adjacent parts of said members.

10. A connector for fishing lines embodying two members, a spacer element between the members intermediate their ends and to which element said members are connected for pivotal movement one with relation to the other, separable co-operating means at one end of the members for receiving and anchoring another element, means whereby one end of a line may be anchored to one of said members, said line being wound about said spacer element and then passed between the other ends of said members, and means at the said other ends of said members for gripping the line, the said separable co-operating means and the said gripping means being simultaneously rendered active and inactive.

11. A connector for fishing lines embodying a body comprising two substantially parallel members connected together intermediate their extremities for pivotal movement one with relation to the other, snubbing means intermediate said members adapted to have a line snubbed therearound, whereby to secure the connector to the line, one end of the line anchored to one of said members, said line passing between the members at one end thereof, and separable anchoring means for another element at the other ends of said members and rendered operative and inoperative by the pivotal movement of one of said members with respect to the other member.

12. A connector for fishing lines embodying a body comprising laterally spaced members connected together intermediate their extremities for pivotal movement one with relation to the other in substantially parallel planes, snubbing means intermediate said members adapted to have a line snubbed therearound, whereby to secure the connector to the line, one end of the line anchored to one of said members, said line passing between the members at one end thereof, separable anchoring means for another element at the other ends of said members, and means for releasably maintaining said members against relative pivotal movement, the said separable anchoring means and the last recited means being simultaneously rendered active and inactive by a relative pivotal movement of said members.

13. A connector for fishing lines embodying a body comprising two substantially parallel members, an element between said members intermediate their ends for connecting the members together for pivotal movement one with relation to the other, said element constituting a snubbing means adapted to have a line snubbed therearound, whereby to secure the connector to the line, one end of the line anchored to one of said members, said line passing between the members at one end thereof, and separable anchoring means for another element at the other ends of said members and rendered operative and inoperative by the pivotal movement of one of said members with respect to the other member.

14. A connector for fishing lines embodying a body comprising two laterally spaced members connected together intermediate their extremities for pivotal movement one with relation to the other in substantially parallel planes, snubbing means intermediate said members adapted to have a line snubbed therearound, whereby to secure the connector to the line, one end of the line being anchored to one of said members, means for gripping said line at one end of said members, and separable anchoring means for another and separate element at the other ends of said members, both said gripping means and the said separable anchoring means being adapted to be rendered operative and inoperative by the pivotal movement of one of said members with respect to the other member.

CHARLES FERNSTROM.